J. H. WELTY.
Bee Hive.
No. 38,348. Patented April 28, 1863.
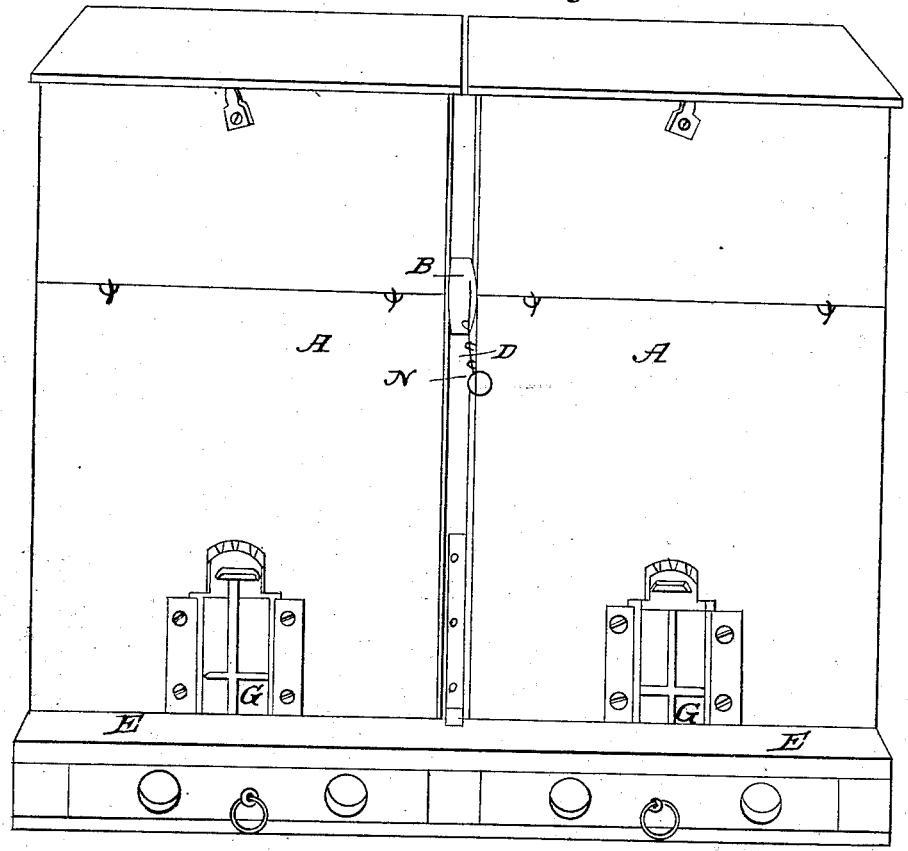
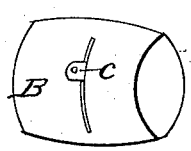
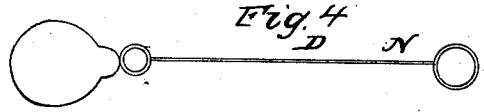
Witnesses
Orner P. Miles
O. S. Beardsly
Inventor
Joseph H. Welty

UNITED STATES PATENT OFFICE.

JOSEPH H. WELTY, OF MOUNT CARROLL, ILLINOIS.

IMPROVEMENT IN BEE-HIVES.

Specification forming part of Letters Patent No. 38,348, dated April 28, 1863.

*To all whom it may concern:*

Be it known that I, JOSEPH H. WELTY, of Mount Carroll, in the county of Carroll and State of Illinois, have invented a new and Improved Mode of Transferring and Hiving Bees; and I do hereby declare that the following is a full and exact description thereof, reference being had to the accompanying drawings, and to the letters of reference marked thereon, the same letters referring to the same parts in the different figures.

The nature of my invention consists in attaching a tube, having a slide with a wire to operate it, to any two bee-hives, so that a communication can be made between the hives when the bees are about to swarm, or when it is desired to transfer bees from one hive to another.

To enable others skilled in the art to make and use my invention, I will proceed to describe its construction and operation.

I construct a short tube, as shown at B, Figures 1, 2, and 3, having a slot near its middle and cut down near to the center, in which the slide C, Figs. 2 and 4, is secured by a rivet, L, as at Figs. 2 and 4, so that the tube can be opened and closed up at pleasure. I construct the slide of tin or any other suitable material, and formed so that it will just close up the aperture in the tube B when it is pressed back by the wire D. I attach the wire D, Figs. 2 and 4, to the slide C, and secure the end at N to one of the hives by a wire steeple, or in any other suitable manner. I transfer the bees from one hive to the other by closing up the hive containing the bees, and cut off the ventilation. I then open the aperture through the tube and ventilate the other hive. The bees will then pass through and occupy the vacant hive, and just before the bees are expected to swarm, I open the connection between the two hives, when the swarm will occupy the vacant hive, thereby causing the bees to hive themselves. The second or empty hive can also be used for surplus honey by opening the connection when the first hive is full.

What I claim as my invention, and desire to secure by Letters Patent, is—

The application to bee-hives of the combination of the slotted tube B, its slide C, and the wire D, when used as and for the purpose substantially as delineated and specified.

JOSEPH H. WELTY.

Witnesses:
OWEN P. MILES,
B. H. HALLETT.